United States Patent [19]
Hattersley

[11] Patent Number: 5,451,128
[45] Date of Patent: Sep. 19, 1995

[54] CUTTER TOOL HAVING REMOVABLE TEETH

[75] Inventor: Terance Hattersley, Sheffield, England

[73] Assignee: T. D. Williamson, S.A., Nivelles, Belgium

[21] Appl. No.: 287,127

[22] Filed: Aug. 8, 1994

[30] Foreign Application Priority Data

Jan. 29, 1994 [GB] United Kingdom ............... 9401715

[51] Int. Cl.$^6$ ............................................. B23B 51/05
[52] U.S. Cl. ............................ 408/204; 83/840; 83/843; 407/40; 407/47; 407/107; 408/713
[58] Field of Search .................. 408/204–206, 408/703, 713; 83/839–841, 844, 846; 407/40, 47, 107, 111, 112, 15, 33, 34, 25

[56] References Cited

U.S. PATENT DOCUMENTS

| | | | |
|---|---|---|---|
| 151,407 | 5/1874 | Luce | 83/840 |
| 239,098 | 3/1881 | Hill | 83/839 |
| 303,787 | 8/1884 | Arnold | 83/839 |
| 526,642 | 9/1894 | Smith | 83/840 |
| 725,469 | 4/1903 | Miner | 83/840 |
| 1,180,377 | 4/1916 | Conklin | 83/840 |
| 2,062,607 | 12/1936 | Reaney | 407/112 |
| 2,964,078 | 12/1960 | Proctor | 83/839 |
| 3,351,998 | 11/1967 | Theiler | 408/204 |
| 3,564,946 | 6/1969 | Kaser | 77/68 |
| 3,959,861 | 6/1976 | Mihic | 407/107 |
| 4,230,429 | 10/1980 | Eckle | 408/186 |
| 4,422,812 | 12/1983 | Linville | 408/204 |
| 4,492,140 | 1/1985 | Pano | 83/839 |
| 4,500,234 | 2/1985 | Orth et al. | 408/206 |
| 4,595,320 | 6/1986 | Berner et al. | 408/182 |
| 4,616,965 | 10/1986 | Anderson et al. | 408/204 |
| 4,679,968 | 7/1987 | Tsujimura et al. | 407/114 |
| 4,968,192 | 11/1990 | Hamilton | 408/144 |
| 5,049,011 | 9/1991 | Bohnet et al. | 408/223 |
| 5,092,718 | 3/1992 | Shallenberger | 408/188 |
| 5,188,490 | 2/1993 | Muendlein et AL. | 408/146 |
| 5,269,618 | 12/1993 | Meyer | 408/188 |

FOREIGN PATENT DOCUMENTS

3831046  3/1990  Germany ............... 407/34

Primary Examiner—Steven C. Bishop
Attorney, Agent, or Firm—Head and Johnson

[57] ABSTRACT

A cutter blade is provided having a cutting face. Formed in the cutting face are a plurality of spaced apart slots, each slot having forward and rearward sidewalls. A tooth is removably received in each of the slots, each tooth having a top surface extending above the cutting face and having forward and rearward sidewalls, The top surface of each tooth has a forward cutting edge and a rearward reduced height step section. A retention bar is provided for each tooth, each retention bar having a forward end that is received in the step section. A pin extending through an opening in each retention bar is threadably connected to the cutting face. By tightening the threaded pin the retention bar retains each tooth during cutting operation so that the tooth sidewalls frictionally engage the slot sidewalls and by unthreading the pin the retention bar may be rotated to permit removal and replacement of each of the teeth.

5 Claims, 5 Drawing Sheets

CUTTER TOOL HAVING REMOVABLE TEETH

CROSS-REFERENCE TO RELATED APPLICATIONS

This application claims the benefit of an earlier filing date under 35 USC 119 based on United Kingdom Patent Application No. 9401715.9 filed 29 Jan. 1994.

CROSS-REFERENCE TO MICROFICHE APPENDIX

This application is not related to any microfiche appendix.

BACKGROUND OF THE INVENTION

This invention relates to a cutter tool having removable teeth. The employment of removable teeth for cutters is known in the prior art as represented by the following United States Patents:

| PATENT NO. | INVENTOR | TITLE |
|---|---|---|
| 3,564,946 | Kaser | Core Borer |
| 4,230,429 | Eckle | Boring Tool For Making Borings in Solid Metal Material Of Workpieces |
| 4,442,812 | Linville | Rotatable Shell Cutter |
| 4,500,234 | Orth et al | Trepanning Tool |
| 4,595,320 | Berner et al | Boring Tool With A Double Cutter Head, In Which The Working Load Is Prevented Outside The Elastic Range Of The Cutting Bit Holder Material In The Vicinity Of The Outermost Radial Positioning |
| 4,616,965 | Anderson et al | Indexable Shell Cutter |
| 4,679,968 | Tsuiimura et al | Indexable Cutter Insert |
| 4,968,192 | Hamilton | Trepanning Tool |
| 5,049,011 | Bohnet et al | Rotary Boring Tool With Indexable Cutter Chips |
| 5,092,718 | Shallenberger | Drill With Replaceable Cutting Inserts |
| 5,188,490 | Muendlein et al | Tool With Adjustable Interchangeable Cartridge |
| 5,269,618 | Meyer | Indexable Insert Drill |

Having replaceable teeth for a cutting tool has many obvious advantages, the primary one being economy. The useful life of a cutting tool is usually determined by the cutting ability of the teeth. When the teeth wear and lose their ability to cut, they can, in some instances, be sharpened in place. However, after repeated sharpening sufficient material may be removed from the teeth that they no longer can perform a cutting function or the teeth may become chipped or broken. A cutting tool having fixed teeth that are beyond sharpening or become broken must be discarded which means discarding the cutter blade that supports the teeth even though the cutter blade itself may otherwise be useable.

An additional advantage of removable teeth is that it is normally easier to sharpen or refinish teeth when they are not a part of a cutter blade. A major advantage, however, of replaceable teeth, is that when teeth become unusable, either because of wear or they are broken or chipped, it is much less expensive to replace one or more teeth in a cutter tool than to discard the entire cutter tool.

A problem that exists with replaceable teeth cutters is that of retaining removable teeth in position in the cutter blade. Cutter tools are frequently used in applications that exert extreme forces on the teeth. For instance, when a cutter tool is used to cut a hole in a steel pipe by means of a circular cutter head the forces on the teeth can be enormous. In addition, substantial vibration may occur between the cutter tool and the work piece. Another example of adverse cutting conditions is the use of a cutter tool to cut non-metallic workpieces, such as granite, concrete, or the like. Obviously, if a tooth becomes loosened in the cutter tool the cutter tool can be destroyed or the workpiece may be damaged. Because of the problem of retaining removable teeth in cutter tools, the use of cutter tools having removable teeth has not been universally employed irrespective of the advantages that otherwise exist for removable teeth cutter tools.

BRIEF SUMMARY OF THE INVENTION

This invention relates to cutter heads of a type which are provided to be mounted on drilling machines and to provide a means for cutting into pipes for the addition of, for example, branch pipes or pressure relief valves or other forms of control apparatus. The cutter heads are of the type which allow the drilling to take place either when the pipe is dead, for instance, when there is no material running therethrough, or when the pipe is live, such as those which carry oil and gas. One particular, but not exclusive, area of application is in the use of cutting heads for tapping into pipelines which carry oil from oil wells to refineries and through the various processing areas of the said refineries. Reference will herein be made to the use of the cutter head in relation to oil pipes, but it should be kept in mind that the invention described is equally relevant to any form of pipeline.

In any pipeline, it is frequently required that additional branch connections, control valves or pressure relief valves be added to the pipeline subsequent to the pipeline being installed. Machines are available for tapping into the pipes and for tapping into said pipes when the oil continues to flow through the pipe. This is a preferred method of tapping into the pipes since shutting down an oil pipe for even 30 minutes is extremely expensive due to the down time of the oil flow and the oil refining apparatus.

In order to tap into the pipe using a conventional apparatus, the first stage is to place a flange in position around the area of the proposed tap into the pipe and to weld or mechanically fix the same into position on the pipe where the addition of, for example, a valve is to occur. The valve is then mounted onto the flange but the pipe at this stage is still solid. A drilling machine of the standard type is then mounted onto the top of the valve and this drilling machine is provided with a downward shaft upon which is mounted a cutter head. There may also be provided a pilot drill in addition to the cutter head and the pilot drill has the purpose of firstly entering the pipe to provide a means of securing the part which is subsequently cut from the pipe. The cutting head is then applied to the pipe to cut through the same and when completed leaves a coupon which has been completely cut out from the pipe and which is removed from the pipe by the retraction of the pilot drill and the retention wires provided on the pilot drill. Thus, the flange, and hence the valve, is now connected to the oil pipe and is an integral part thereof. At the same time, all the material cut is removed externally of the pipe and hence the flow of oil is not contaminated. This system has been used for a considerable number of years and is regarded as a conventional tapping system for pipes. The cutter head which is used in this system is typically a cylindrical head with at one end a number of cutting teeth brazed thereon and these teeth, when the cutter head is rotated, serve to cut into the pipe. Typically, a conventional cutter can be used to cut two holes in pipes before checks are made as to the sharpness of the teeth. If the teeth are still relatively sharp, a third hold may be cut, but it is then required that the teeth be reground and resharpened to allow the cutter head to be used again.

The cutter head is typically formed of steel while the teeth which are brazed onto the cutter head could be formed of any of, tungsten hard metal, high speed steel, uncoated or coated with surface coatings or any other standard cutting medium. Typically, the teeth are brazed onto the cutter head and the cutter head will be used for specific pipes formed from specific materials. As the uses of pipes increase for various chemical substances so do the different forms of material from which the pipes are required to be made. For examples, in the chemical industry, stainless steel pipes are required to be used and, furthermore, when the pipes are used to carry high temperature or high pressure materials, the pipes can experience work and heat hardening which alters the structure of the pipes during use. As a result of this, the materials for the cutting teeth for the cutter head are required to be varied with respect to the pipe material to be cut. It is now common for two or three cutter heads to be supplied to the site of any one job to ensure that a correct cutter head can be used upon studying the material and condition of the pipe. While this requirement is convenient when used in plants where the pipeline is easily accessible and is relatively close to the supply point for the cutter heads, it causes major problems when the pipeline is in remote and/or inaccessible areas. This is particularly relevant with respect to oil pipes which frequently run through areas which are remote, cannot be easily accessed and where weather conditions can be inclement. In these conditions, it is conventionally necessary to transport a considerable quantity of cutter heads to overcome the problems of the cutter heads wearing out after two or three cuts into the pipe and also to ensure that the necessary heads with teeth formed of various materials are available to take into account the material and condition of the pipe. This causes a severe inconvenience on both the amounts of materials which are required to be carried and a further inconvenience in the expense and waste of time if the wrong cutter heads are taken.

The aim of the present invention is to provide a cutter head which can be adapted to have cutting teeth to suit the particular purpose for which it is to be used in terms of the material of the pipe in which the cut is to be made and to allow the easy replacement of worn cutting teeth. By providing a cutter of this type the need to transport and carry numerous cutter heads would then be eliminated and the savings made in terms of cost and time would be substantial.

The present invention provides a cutter head for use in association with tapping and drilling machines for tapping into and cutting a coupon from a pipeline, said cutter head comprising a cylindrical body provided with cutting teeth at one end thereof wherein at least some of the cutting teeth are removable from the cutter head and are replaceable with teeth which are sharper and/or formed of a different material or different cutting characteristics.

Preferably each of said cutting teeth will be held in a location groove on the edge of the cutter head, a plurality of said grooves being provided around the periphery of the edge.

In one embodiment, the cutter teeth will be formed in relation to the groove such that they are self-locking in the said groove and are releasable only by the exertion of force thereon.

In a second embodiment, the cutting teeth will be held in the groove by the provision of a clamping means which, when a tooth is in position, acts to maintain the tooth therein. Preferably, the clamping means will be movable from a first position to allow the tooth to be fitted and/or removed and a second position whereby the clamp maintains the tooth in the location groove.

The cutter head of the invention will be of any conventional size but typically can be of a range from 5 cm to 100 cm in diameter. The number of teeth provided in any cutter head will depend upon the particular application of the cutter head. Preferably the teeth will be manufactured from a range of materials similar to those which are used for conventional teeth. Typically one set of teeth, if manufactured from, for example, high speed steel may be used to cut a hole into a first pipe, but for a subsequent pipe made of a different material a set of teeth of a second material may be required and therefore the set of teeth fitted to the cutter head will be removed and the new set of teeth of the second material inserted in their place to allow the second pipe to be cut. Similarly, if the set of teeth fitted to the cutter head have been used in two or three cuts and have become worn, they can simply be removed and replaced with new sharper teeth.

The invention provides a cutter head which includes at one end thereof a cutting face comprising a plurality of teeth and said teeth are removable if required to allow a new set of teeth of the same or different material to suit a particular use to be inserted. The invention allows one or two cutter heads to be carried to a site along with a plurality of sets of cutting teeth thereby minimizing the amount and size of materials to be carried to the site where a pipe is to be tapped. In areas where the transport of materials is difficult and the area is remote, the ease of transport ensures that a complete range of cutting teeth can be carried hence ensuring that the cutter head can be adapted to provide the best possible cut into the pipe and minimize the time taken.

An improved embodiment of the invention includes the arrangement wherein the cutter blade spaced apart notches that hold the removable teeth have forward and rearward sidewalls that taper with respect to each other. The tapered sidewalls receive a tooth having opposed sidewalls that are likewise tapered. By this arrangement the tooth can be driven into a tapered notch so that the tapered sidewalls of the tooth securely frictionally engage the tapered sidewalls of the notch in the cutter blade cutting face so that the tooth is securely held in position in the cutting face.

This invention provides a cutter blade having a cutting face into which is formed a series of spaced apart notches that receive removable teeth in an improved and more effective way. The cutter blade can be tubular (that is, with a toroidal cutting face), or the cutter blade may be planar with a circular cutting face (such as commonly used in hand held electrical saws, radial arm saws and the like) or the cutter blade may be planar with a straight cutting face.

A better understanding of the invention will be obtained from the following description and claims, taken in conjunction with the attached drawings.

DESCRIPTION OF THE DRAWINGS

FIGS. 11A through 11D show one configuration of a tooth as employed in FIG. 7.

FIGS. 12A through 12D show an alternate embodiment of the design of the replaceable tooth in which the tooth is configured to cut along the right boundary.

FIGS. 13A through 13D show a third embodiment of a tooth designed to perform a center cutting action.

DESCRIPTION OF THE PREFERRED EMBODIMENTS

Figure 1:
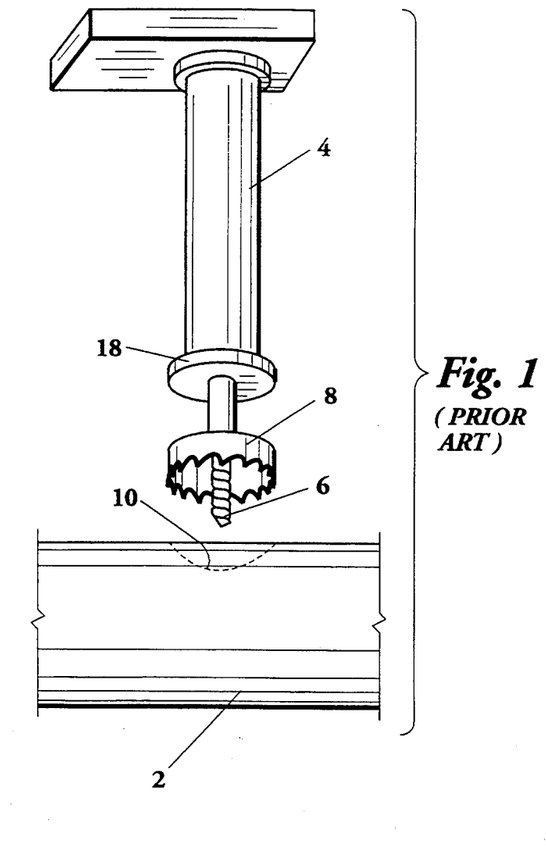
FIG. 1 slows a perspective view of a typical cutter head and tapping machine arrangement.
Figure 2A:
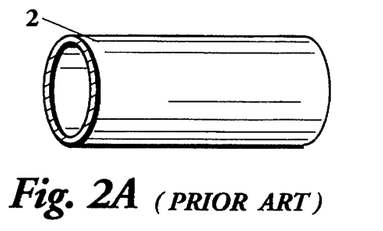
FIGS. 2A to 2D show the various stages involved in tapping into a pipe.
Figure 2B:
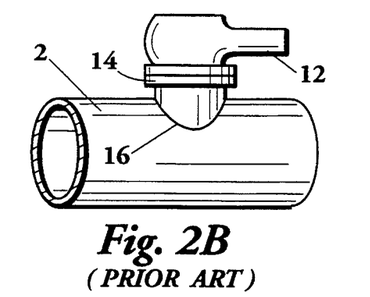
Figure 2C:
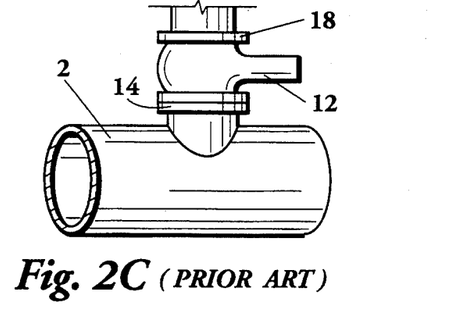
Figure 2D:
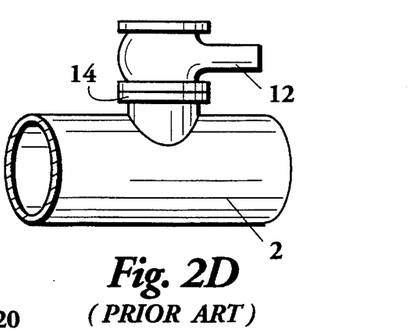

Referring first to FIG. 1 there is shown an arrangement for tapping into a pipeline 2. The apparatus consists of a tapping machine 4 which is mounted a pilot drill 6 and a cutter head 8. The pilot drill 6 and cutter head 8 are arranged for rotation by the tapping machine 4 such that the introduction of the pilot drill 6 to pipe 2 causes an initial hole to be drilled followed by the application of the cutter head 8 and to the pipe 2 to cause the coupon shown in dotted line on the pipe 2 to be cut. Coupon 10 is removed from the pipe by means of the pilot drill retention means (not shown) which lifts the coupon out from the pipe and prevents it from entering the pipe flow. While this operation occurs the pipe can continue to carry the substance, such as oil flowing through the pipe, without interruption of the flow.

The illustrations of FIG. 2 show the basic steps involved in tapping into the pipe. FIG. 2A shows a pipe 2 which, in this case, would be used for carrying oil or chemicals and could be for example manufactured from stainless steel. In this case, a valve is to be fitted to pipe 2 and FIG. 2B shows such a valve 12. In order to achieve fitting, a flange 14 is first mounted on the pipe at the desired position and is welded or mechanically fixed to the pipe along the line 16. When the flange is in position, but without the pipe having been tapped, valve 12 is mounted on flange 14 in a position for use. FIG. 2C shows the valve in position on flange 14 and pipe 2 and to the top of the valve 12 there is connected a flange 18 of the tapping machine. With the tapping machine held in place on the flange, the pilot drill 6 and the cutter head 8 are moved downwardly through the housing of valve 12 and through the housing of flange 14 to enter pipe 2. The rotation of the pilot drill 6 and the cutter head 8 serves to cut through the pipe 2, and the coupon 10 formed is then removed by the retraction of the cutter head and pilot drill through the flange and the valve housing. When this is completed, the tapping machine is removed and the valve housing sealed to form a pipe as shown in FIG. 2D with the valve in place and connected to the pipeline. Similar operations can be undertaken to install a branch line or to construct a diversion pipeline to allow maintenance of the pipe. In all cases the tapping arrangement as shown and described can be undertaken while the material flowing through the pipe continues to flow and without interruption.

Figure 3:
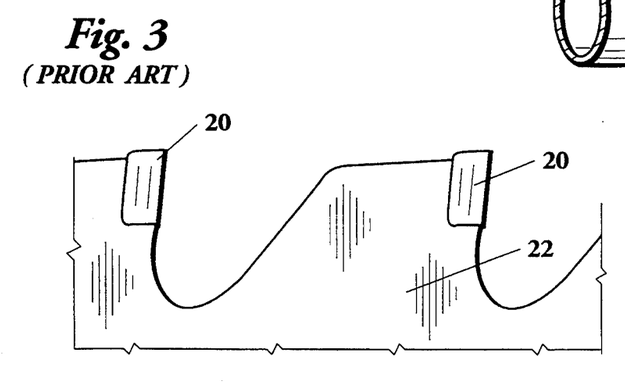
FIG. 3 Shows a typical tooth of a conventional cutter head.

Referring now to FIG. 3, there is shown a section of the conventional cutter head edge wherein there is formed thereon a series of teeth 20 which, when applied to a pipe and rotated, cause coupon 10 to be cut in the pipe. In a conventional cutting head as shown, teeth 20 are brazed on to the cutter head 8 and, once brazed thereon, cannot be removed. The only action which can be undertaken on the teeth after the brazing of the same onto the cutter head is the possibility of regrinding the teeth to sharpen the same, however, it is impossible for the teeth to be removed and replaced by teeth of alternative materials or for new sharper teeth of the same material to be fitted without substantial engineering work.

Figure 4:
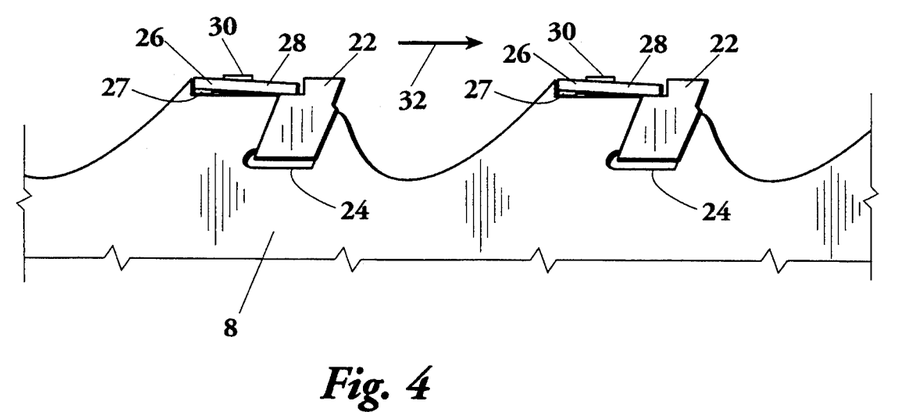
FIG. 4 shows a typical tooth arrangement of the cutter head of this invention.
Figure 5A:
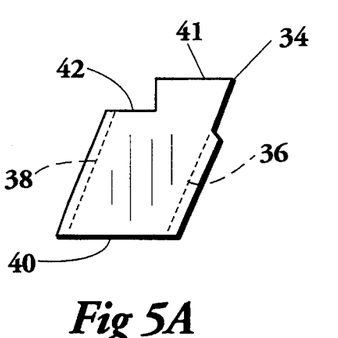
FIGS. 5A to 5E show various views of one cutter tooth of the invention.
Figure 5B:
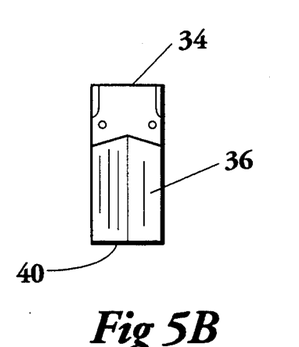
Figure 5C:
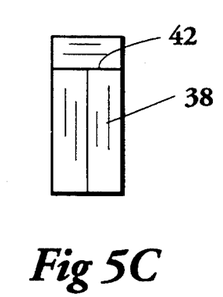
Figure 5D:
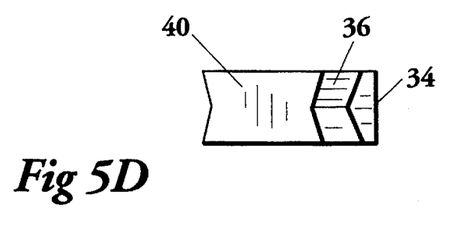
Figure 5E:
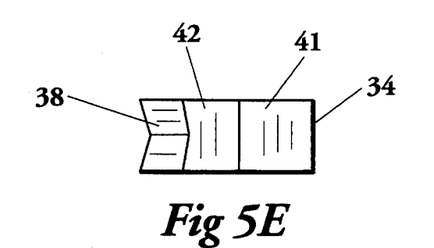

FIG. 4 illustrates several teeth of the cutter head of the invention. The teeth 22 of the invention are shown fitted into location grooves 24 which are provided in the cutter head 8. The teeth 22 are typically shaped to be self-locking in the grooves 24 but, if necessary, clamping arrangements 26 are provided. The clamping arrangement comprises a bar 28 pivotally moveable on to pin 30 which is secured into the cutter head 8 and which can be tightened to secure the teeth 22 in place and has a locking wedge 27 provided therein to prevent same from rotating during use of the cutter head to allow the tooth to be released. Each of the clamps are moveable from a first position where it protrudes from the edges of the cutter head to allow the fitting or removal of tooth 22 in location groove 24 to a second position as shown wherein the portion of the clamp lies over a notch provided in tooth 22 serving to locate tooth 22 in this location groove 24. When in this position the cutter head is now available to be used and would be rotated in the direction of the arrow 32. FIGS. 5A to 5E show various views of a tooth which can be used in the invention.

The tooth consists of a cutting edge 34 which is located on the outer head to face the direction of rotation and the tooth is also provided with a series of shaped edges 36 and 38 which are shaped to match with the shaped location groove on the cutter head to provide a self-locking fit of the tooth in the groove. Similarly base 40 is shaped to allow the sliding fit to be achieved and locking to take place. The top 41 can also be shaped to allow improved removal of materials and is also provided with a step section 42 for location of the clamp thereon.

The invention provides a cutter head as illustrated in FIG. 4 which has teeth 22 and location grooves 24. The cutter head can then be used to tap into a pipeline and can be used again to drill second and third holes as appropriate. If the teeth then become worn, they can be removed on site and new teeth introduced relatively quickly by a simple operation of releasing the clamping means provided. Thus, successive tapping of pipes can take place with a minimum of lost time. Additionally, if the tapping of more than one type of pipe is required in a particular job and the pipes are manufactured from different materials, it will be required to change the teeth fitted to suit a set of teeth with the particular cutting requirements for particular pipes. Again, the cutter head of the invention provides a means whereby sets of teeth made from different materials can be removed and replaced as appropriate on site. Furthermore, the teeth which have been removed can then be returned to the factory at the convenience of the operator to be reground and reused later.

The present invention provides a cutter head which can be adapted to specific requirements for specific pipes and also allows the easy replacement of worn teeth on site. With the ability to change the facilities of the cutter head on site, considerable savings in time and cost are achieved especially where the cutting and tapping operations on the pipes are undertaken in remote and inclement areas. No conventional cutter head can achieve this.

Figure 6:
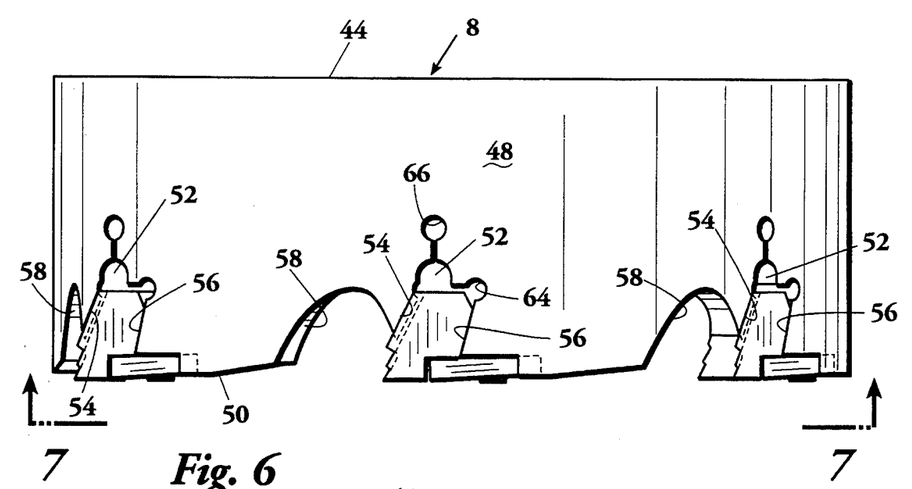
FIG. 6 is an elevational view of a tubular cutter blade, sometimes referred to as a "shell cutter", as used for cutting a coupon out of a workpiece and showing improved means of retaining the teeth in spaced apart notches in the tool cutting face.
Figure 7:
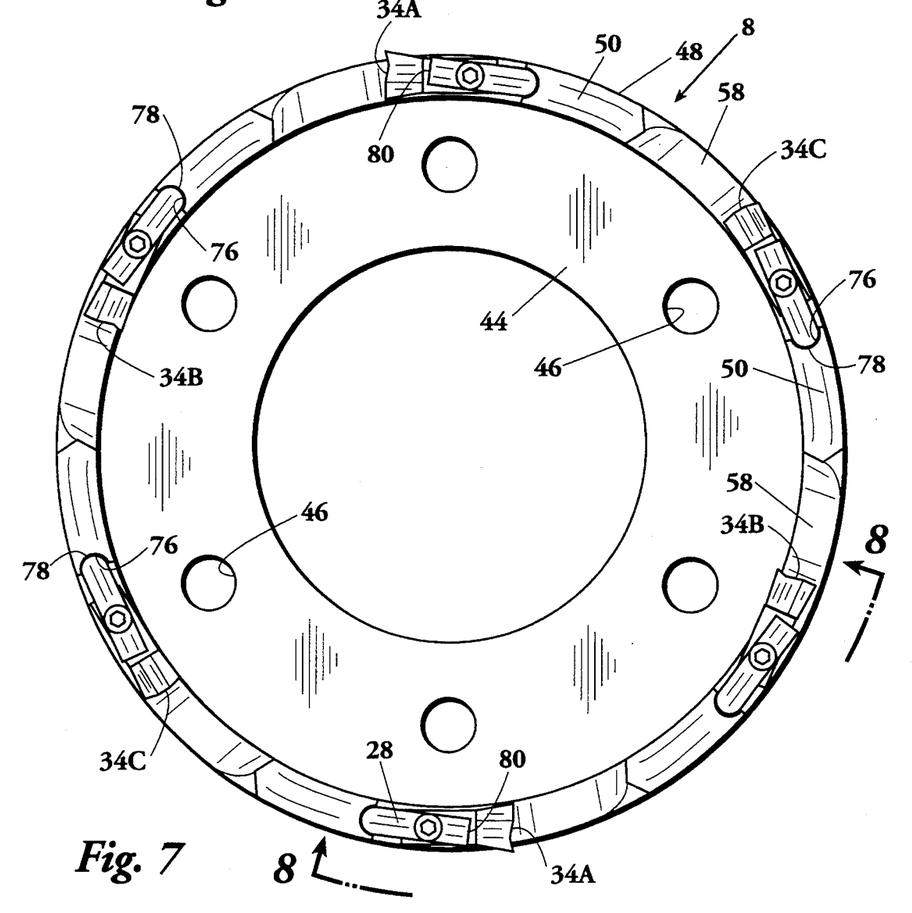
FIG. 7 is an end view of the tubular cutter shell, taken along the line 7—7 of FIG. 6, showing the replaceable teeth arrangement.
Figures 8, 9, 10:
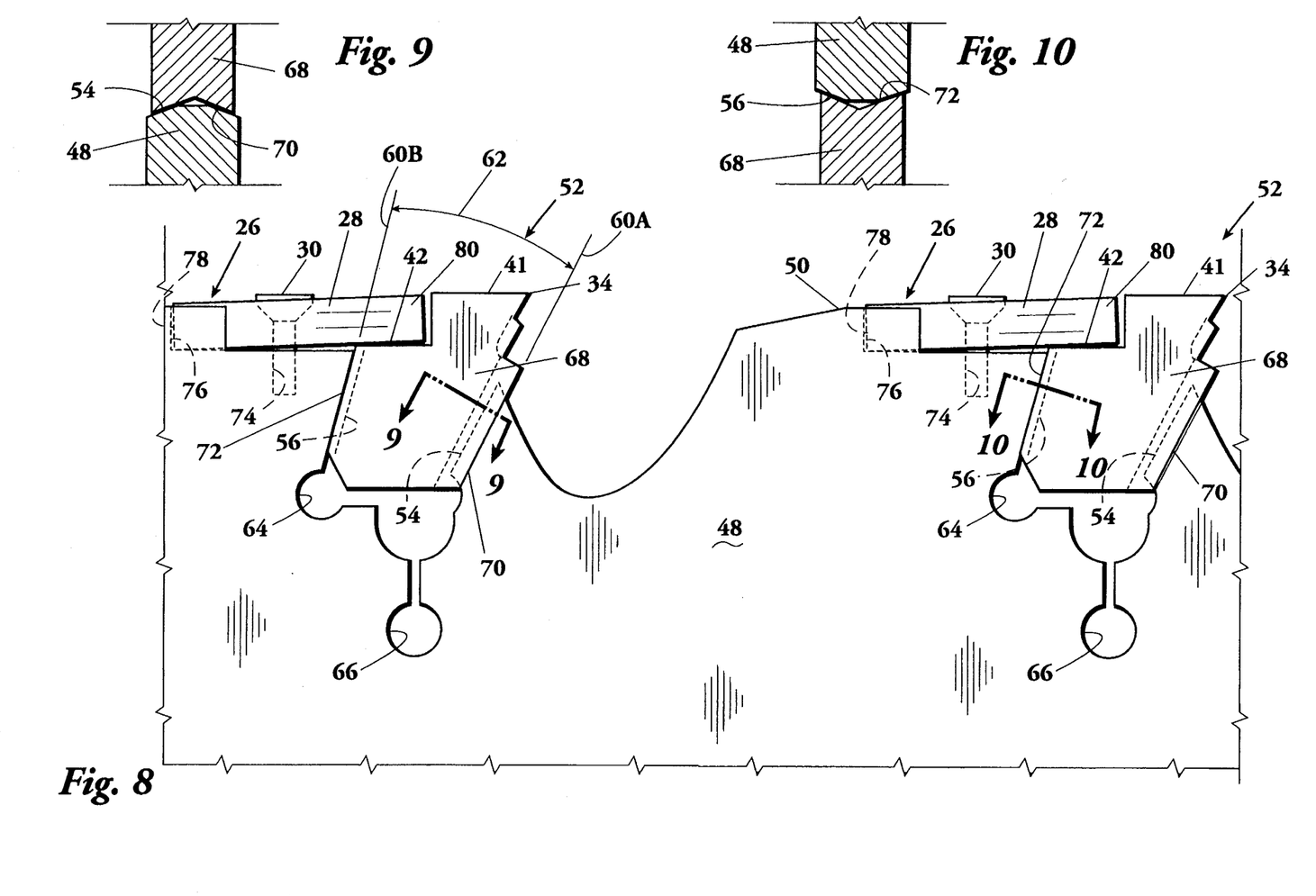
FIG. 8 is an enlarged fragmentary view of a portion of the tubular cutter shell of FIG. 6 showing two replaceable teeth as supported in the shell cutting face.
FIG. 9 is a fragmentary cross-sectional view of a portion of a tooth and the cutter shell showing the relationship between the tooth forward sidewall and the cutter shell forward sidewall.
FIG. 10 is a fragmentary cross-sectional view showing the relationship between the tooth rearward sidewall and the slot rearward sidewall by which the tooth is removably retained in the cutter blade.
Figure 11A:
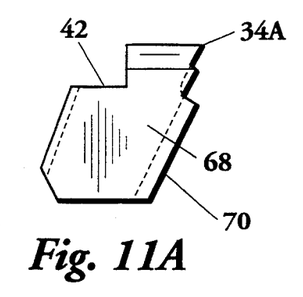
FIG. 11A is an elevational view; 11B is a top plan view; 11C is a rear elevational view and 11D is a front elevational view.
Figure 11B:
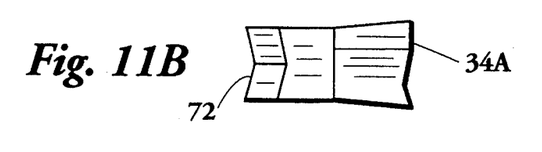
Figure 11C:
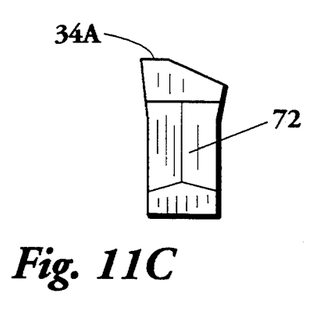
Figure 11D:
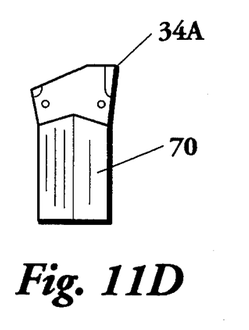
Figure 12A:
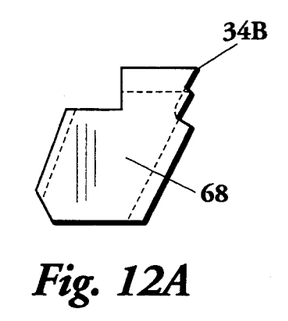
FIG. 12A is an elevational view of the tooth; 12B is a top plan view; 12C is a rearward elevational view; and 12D is a front elevational view.
Figure 12B:
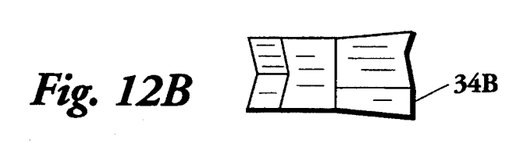
Figure 12C:
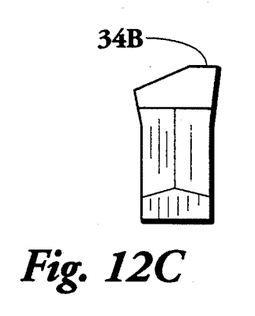
Figure 12D:
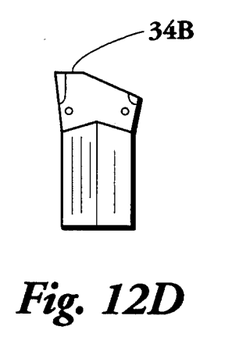
Figure 13A:
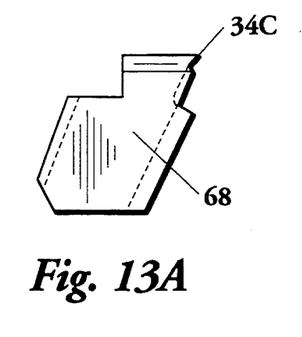
FIG. 13A is an elevational side view of the tooth; 13B is a top plan view; 13C is a rearward elevational view; and 13D is a front elevational view.
Figure 13B:
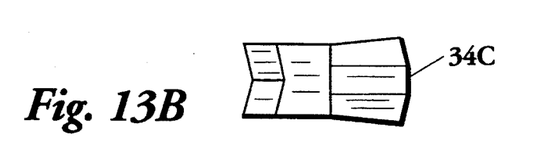
Figure 13C:
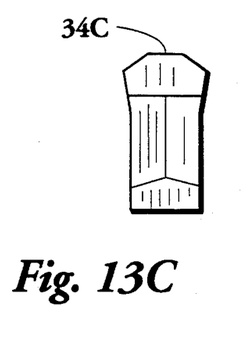
Figure 13D:
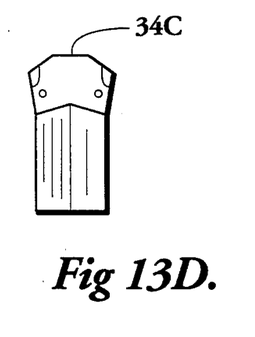

Referring to FIGS. 6 through 8, an improved embodiment of the cutter head is shown. FIGS. 6 and 7 show a tubular cutter head generally indicated by the numeral 8. The cutter head 8 includes a body portion 44 that is adapted to be connected to a rotating device, such as by means of bolts extending through openings 46. An integral tubular cutting blade portion 48 provides a toroidal cutting face 50. Cutting face 50 is provided with a plurality of spaced apart slots 52. Each of the slots 52 includes a forward sidewall 54 and an opposed rearward sidewall 56. Formed in cutting face 50 forwardly of each slot 52 is an arcuate recess 58. The functions of recess 58 are primarily to provide clearance for the cutting edges of the teeth and an area in which to receive cuttings shaved from the work piece (not shown) that is cut by the teeth.

FIG. 8 is an enlarged fragmentary view showing more details of the arrangement of slots 52. Dashed lines 60A and 60B show an extension of the angle formed by forward and rearward sidewalls 54 and 56, the angle being indicated by the arc 62. The angle indicated by arc 62 is preferably about 12° which is by way of example since the angular relationship between the forward and rearward slot sidewalls 54 and 56 may vary. Slot 52 is further defined by stress relief areas 64 and 66 for purposes to be described subsequentally.

Positioned in each slot 52 is a tooth 68 of the type generally described with reference to FIGS. 4 and 5A through 5E but having the important difference that tooth 68 has a forward sidewall 70 and a rearward sidewall 72 which extend in planes that form an angle substantially the same as angle indicated by the arc 62. That is, the angular relationship between forward and rearward sidewalls 70 and 72 of tooth 68 preferably conform to the angular relationship between slot forward and rearward sidewalls 54 and 56. Tooth 68 is driven into position in slot 52. Because of the angular relationship, when a tooth 68 is properly seated in slot 52, frictional engagement is formed between the tooth sidewalls and the slot sidewalls.

As shown in FIGS. 9 and 10, the slot sidewalls and the tooth sidewalls are preferably configured to provide a contoured interrelationship, that is, whereby a tooth, once firmly positioned in a slot is locked against lateral movement. This is accomplished in the illustrated embodiment wherein, as shown in FIG. 9, forward sidewall 70 of tooth 68 is concave in configuration and forward sidewall 54 of the portion of the notch formed in tubular cutting blade 48 is of convex configuration. FIG. 10 shows the same relationship between the tooth rearward sidewall 72 and slot notch rearward sidewall 56. It can be seen that the sliding and locking relationship between the sidewalls of each tooth and the sidewalls of the slots can be of different configurations while still providing a locking relationship. For instance, instead of being formed of angular configurations the sidewalls could be arcuately concave and convex and achieve the same results.

Since teeth 68 of the embodiment of FIGS. 6 through 10 are configured to be driven into place or at least positioned in such a way that frictional engagement is attained between the teeth and slot sidewalls, a force will be applied due to the angular relationship, tending to spread the slot sidewalls 54 and 56 apart. To absorb the force of this spreading action, the slot is provide with semi-circular stress relief areas 64 and 66 so that the stress is not concentrated in the tubular cutting blade portion.

As was previously discussed with reference to FIGS. 1 through 5A–5D, each tooth is provided with a step portion 42 that is of reduced height compared to tooth top 41. This step portion receives bar 28 as previously discussed. Bar 28 is held in position by a threaded bolt or screw 30 that extends in a threaded opening 74 formed in cutting face 50. As previously discussed, it is desirable to provide a clamping arrangement, generally indicated by numeral 26, to maintain bar 28 in orientation with cutting face 50. In the embodiment illustrated in FIGS. 6 through 8, and best seen in FIG. 7, this can be attained by providing a semi-circular recess 76 in cutting face 50 in which the semi-circular contoured rearward end 78 of bar 28 is received. The forward end 80 of each bar 28 is received in a step section 42 of a tooth 48. When pin 30, which as previously indicated is preferably a bolt or screw, is firmly threaded into position, forward end 80 of each bar 28 engages a tooth 68 to securely hold it in position.

Each tooth 68 has a cutting edge 34 as previously described. As shown in FIG. 7, teeth 68 may be provided with a variety of cutting edge configurations. This technique is commonly employed in sawing action. As shown in FIG. 7, two of the teeth 68 have a cutting edge 34A that cut primarily on the inner perimeter of the cutting face 50. Teeth 34B are configured to cut primarily on the outer perimeter, and 34C are configured to cut in the middle, that is, between the inner and outer perimeters. In this way, none of the teeth are required to cut the entire groove formed in the workpiece. However, if desirable, each tooth could be identical, in which case the cutting edge of each tooth must therefore be of a width greater than the width of the cutting face 50 since the groove cut must exceed the width of the tubular cutting blade portion 48 to allow the cutting blade to advance as a groove is formed in a work piece by cutting action.

FIGS. 11A through 11D show details of the configuration of a tooth 68 having the configuration of teeth 34A, that is, where the tooth has a cutting edge 34A that is concentrated on the inside of the tooth. FIGS. 12A through 12D show the configuration of a tooth 68 wherein the cutting edge 34A concentrates the cutting action on the outer perimeter of the cutting face, while FIGS. 13A through 13D show teeth having the cutting face 34C that concentrates the cutting action in the center.

The principles of this invention have been illustrated as applied to a circular saw sometimes called a cutting shell wherein the cutter blade is tubular and has a toroidal cutting face. The principles of the invention, that is, the concept of an improved method of mounting removable teeth in the cutting face of a cutter blade can be applied to saws of other configuration, such as to a circular saw, that is, where the cutter blade is in a plane having a circular cutting face, or to a straight saw wherein the cutter blade is in a plane having a straight cutting face. As previously indicated, the principles of the invention are applicable for a saw for cutting metal or other non-metallic materials, such as stone, masonry, plastic or the like.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A cutter tool comprising:
   a cutter blade having a cutting face, the cutting face having a plurality of spaced apart slots formed therein, each slot having opposed forward and rearward sidewalls;
   a tooth removably received in each said slot, each tooth having a top surface and opposed sidewalls, the tooth sidewalls being dimensioned to slidably engage said cutter head forward and rearward sidewalls as the tooth is positioned in a said slot, the tooth top surface having a cutting edge, wherein said sidewalls of each said slot are tapered towards each other in the direction away from said cutting face and wherein said sidewalls of each said tooth are tapered towards each other in the direction away from said top surface;
   a retention bar for each said tooth, each retention bar being of a width not greater than said cutting face and having a forward end and a rearward end, and
   means to releasably retain each said retention bar on said cutter blade cutting face whereby a said forward end of each said retention bar engages a said tooth top surface, each said tooth being retained in a said slot by frictional engagement of the sidewalls thereof with said slot sidewalls and by a said retention bar.

2. A cutter tool according to claim 1 wherein said slots and said teeth are tapered at an angle of about 12 degrees.

3. A cutter tool according to claim 1 wherein said means to releasably retain said retention bar includes a threaded bolt received in an opening in said retention bar, the opening being intermediate opposed ends of said bar, the bolt being threadably received in a threaded hole in said cutter blade cutting face, whereby said retention bar may be rotated in one position about said bolt to permit said a tooth to be removed and rotated in another position to engage a said tooth to retain said tooth in position in a said slot.

4. A cutter tool according to claim 1 wherein said cutter blade cutting face has a recess therein spaced from each said slot rearward sidewall and wherein said rearward end of said retention bar is received in said recess when said forward end is in engagement with a said tooth.

5. A cutter tool according to claim 1 wherein said cutter blade is tubular for use in cutting a circular hole.

* * * * *